United States Patent [19]

Stott

[11] 3,715,234

[45] Feb. 6, 1973

[54] NON-RECTIFYING COMPOSITE CONTACT FOR SEMICONDUCTOR DEVICES

[75] Inventor: Ronald A. Stott, North Syracuse, N.Y.

[73] Assignee: General Electric Company

[22] Filed: Dec. 28, 1970

[21] Appl. No.: 102,065

Related U.S. Application Data

[62] Division of Ser. No. 746,861, July 23, 1968, abandoned.

[52] U.S. Cl. ...............117/217, 117/107, 317/234 L, 317/234 M

[51] Int. Cl. ...............B44d 1/18

[58] Field of Search.117/217, 107; 317/234 L, 234 M

[56] References Cited

UNITED STATES PATENTS

| | | | |
|---|---|---|---|
| 2,814,589 | 11/1957 | Waltz | 317/234 M |
| 3,307,088 | 2/1967 | Fujikawa et al. | 317/234 M |
| 3,436,818 | 4/1969 | Merrin et al. | 317/234 M |

*Primary Examiner*—Alfred L. Leavitt
*Assistant Examiner*—Cameron K. Weiffenbach
*Attorney*—Robert J. Mooney, Nathan J. Cornfeld, Frank L. Neuhauser, Oscar B. Waddell and Melvin M. Goldenberg

[57] ABSTRACT

This invention relates to an improved non-rectifying metallic contact for a semiconductor body comprising a composite structure made up of a plurality of inter-diffused layers. This composite structure consists of a first layer of metallic material non-rectifyingly bonded to the surface of said body. A second layer of metallic metal surmounts said first layer to prevent the mixing of said first layer with any other layer at temperatures below the eutectic temperature of said first layer with said body. The second layer is covered by a third layer of an N-type conductivity-determining material. A fourth layer of noble metal is applied over the third layer to facilitate soldering of an external connector or support member to the contact. The multiple layers are then heated to form an interdiffused mixture of metallic layers that produce an adherent, non-rectifying, composite contact to said body.

2 Claims, 2 Drawing Figures

NON-RECTIFYING COMPOSITE CONTACT FOR SEMICONDUCTOR DEVICES

Figure 1:
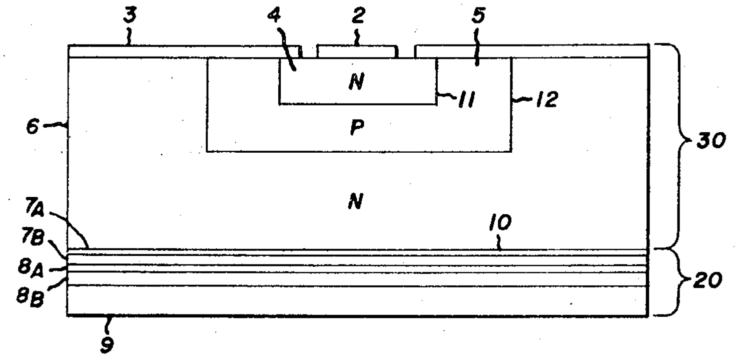

This is a division of application Ser. No. 746,861 filed July 23, 1968, now abandoned.

This invention relates to improvements in semiconductor devices. More particularly, the invention relates to an improved non-rectifying contact for a body of semiconductor material. Further, this invention relates to an improved composite contact and a method of making the same.

As is well known to those skilled in the art, when mounting or securing a semiconductor pellet or body to a support member, it is often necessary to use some type of metal layer as an intermediate solder-like bonding material. The metal layer is generally in the form of a thin preform, i.e. a separate plate or strip of approximate size and shape, usually corresponding to the size and shape of the pellet to be mounted, placed between the mountdown side, or under side, of the pellet and the support member. The metal layer may also be attached to either the mountdown side of the pellet or to the support member itself. The type of metal most commonly used for this metal layer has been a single layer of either a noble metal such as gold or a noble metal alloy. Noble metals and noble metal alloys are suitable for this application because they do not readily oxidize and they form eutectic alloys with a semiconductor material at relatively low temperatures, i.e. in the range of 300°–650° C.

The use of a preform, however, produces a number of disadvantages: the preform may slip and cause uneven or misaligned alloying; voids are often encountered during mountdown causing poor thermal conductivity; a higher mountdown temperature (i.e. about 50°C above that normally used) is usually required when a metal preform is used: and the pellet surface often becomes oxidized prior to the mountdown step due to the lack of protection of the semiconductor surface from oxide regrowth.

In order to eliminate these problems more emphasis has recently been placed on applying the metal layer directly to the mountdown side of the pellet prior to bonding or joining the pellet to its supporting substrate. This allows for the exact positioning of the metal layer, thereby eliminating uneven or misaligned alloying; reduces voids; and protects the surface of the pellet from oxidation by covering it with a non-oxidizing metal layer such as gold. The mountdown temperature can also be lowered because there is a better contact at the interface of the pellet and the metal layer. All of these advantages combine to produce a better non-rectifying contact between the pellet and its applied metal layer. However, when a single layer of noble metal such as gold or a noble metal alloy is used in this manner, additional problems arise, particularly with regard to etched semiconductor surfaces. For example, in order to obtain good adherence to a semiconductor surface using either a pure gold or a suitable gold alloy layer, a relatively oxide-free semiconductor surface is essential. This is often difficult to obtain. Further, when silicon is used, voids are often found on the silicon surface after the single layer is applied. These voids tend to oxidize during the storage of the pellet, thereby causing mountdown problems and many of the problems previously discussed relative to the use of gold preforms of strips.

Accordingly, it is one object of this invention to provide a non-rectifying, composite contact for a semiconductor pellet that will protect the mountdown surface of the pellet from oxidizing during storage.

Another object of this invention is to provide a non-rectifying, composite contact for a semiconductor pellet that has good thermal conductivity properties, thus increasing the heat dissipation and power stability properties of the semiconductor device.

Another object of this invention is to provide a non-rectifying, composite contact for a semiconductor pellet having either an etched, lapped, or polished surface.

Another object of this invention is to provide a non-rectifying, composite contact for a semiconductor pellet that can be used to bond said pellet to a suitable support member without the use of a preform.

Another object of this invention is to provide a non-rectifying, composite contact for a semiconductor pellet that can be used to bond an electrode lead to said pellet.

Another object of this invention is to provide a non-rectifying, composite contact for a pellet that can be used to reduce the time and temperature necessary to mountdown a semiconductor pellet to a support member.

Another object of this invention is to provide a non-rectifying, composite contact for a semiconductor pellet that includes an interdiffused mixture of at least four laminated layers containing at least three different metallic elements, i.e. a first metallic element such as antimony that will promote good wetting and bonding to the pellet without deleteriously affecting the impurity concentration or conductivity type thereof, a second metallic element such as phosphorus to provide a uniform N-type doping throughout the composite contact without deleteriously affecting the impurity concentration or conductivity type of the pellet and a first noble metal to ensure that said composite contact meets the soldering and bonding requirements of the pellet to a support member or electrode lead.

Figure 2:
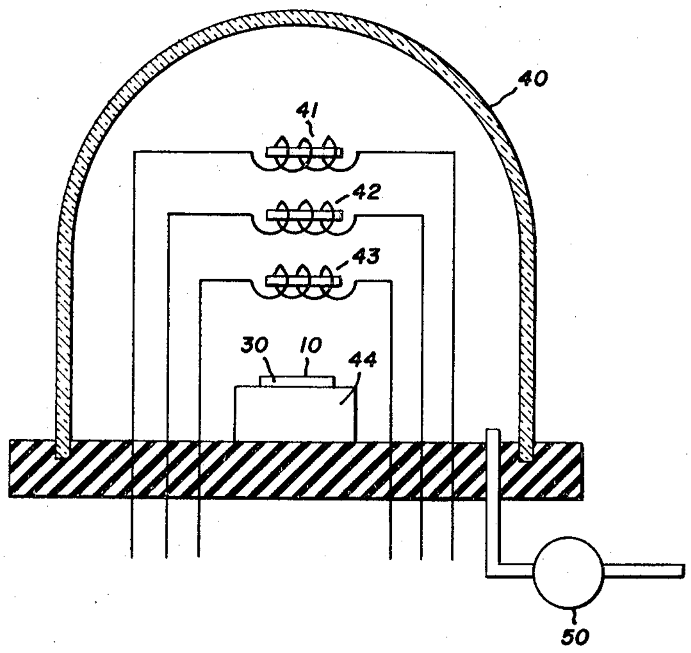

These and other objects of this invention will be apparent from the following description and the accompanying drawings, wherein:

FIG. 1 is a cross-sectional view of one form of a semiconductor device provided with a non-rectifying, composite contact according to the present invention; and FIG. 2 shows an evaporation chamber which may be used in practicing the invention.

Briefly, the composite contact is initially formed in a laminated structure consisting of at least four layers including at least three different metallic elements. The number of layers formed depends on the choice of the method used to fabricate the composite contact and on the thickness of noble metal necessary to meet the bonding and soldering requirements of the pellet to a support member or electrode lead. Subsequently, after the layers are applied, they are heated to a desired temperature and form an interdiffused mixture of metallic elements that produce an adherent, non-rectifying contact.

A first layer of a metallic element such as antimony should be used as the initial layer to ohmically engage the semiconductor surface in order to promote good wetting and bonding between the surface to be covered and the other layers of the composite contact without deleteriously affecting the impurity concentration or conductivity type of the surface. A second layer of noble metal such as gold is used between the first and third layers to prevent their respective metallic elements from mixing prior to the heating cycle. A third layer of a metallic element such as phosphorus, which is never the first or last layer of the laminated structure, is used to provide a uniform N-type doping throughout the composite contact without again deleteriously affecting the impurity concentration or conductivity type of the surface. A fourth layer of a noble metal such as gold is always used as the last layer of the laminating structure to ensure that the composite contact meets the soldering and bonding requirements of the pellet to a support member or electrode lead.

In FIG. 1 there is shown one exemplary embodiment of a semiconductor device 1 provided with a contact in accordance with the invention. The semiconductor device of FIG. 1 is a planar NPN transistor including an N-type conductivity collector region 6, a P-type conductivity base region 5 and an N-type conductivity emitter region 4. The external face of the collector region 6 is indicated by 10 and may have either an etched, lapped, or polished surface, depending on device requirements. The two internal junctions, i.e. the emitter-base junction 11 and the collector-base junction 12, are covered by a protective coating 3, which may be, for example, silicon oxide. In the center of the emitter region 4 is the emitter electrode 2 which may be made of a metal such as aluminum or of a composite contact such as described in this invention.

Although this example shows the collector region 6 to be made of N-type conductivity silicon, other types of semiconductor materials may also be used. However, if a P-type conductivity semiconductor material is to be used as the region contiguous with the composite contact, then its P-type doping level should be sufficiently high to prevent the conversion of the P-type conductivity to an N-type conductivity. Otherwise the N-type dopant impurities in the composite contact may subsequently form a rectifying junction in the P-type conductivity region and ruin the electrical characteristics of the device. All of the methods needed to form the above portions of the NPN transistor 1, excluding the composite contact, are well known to those skilled in the art and are not part of this invention.

Applied to the surface of interface 10 is a preferred example of a composite contact constructed according to the present invention, and which serves as the collector electrode. As shown in FIG. 1, the first layer 7A of the laminated composite contact 20 is antimony, the second layer 7B gold, the third layer 8A phosphorus, the fourth layer 8B gold, and the fifth layer 9, if necessary, is gold.

One detailed example will now be described of a suitable method of forming such a laminated contact in accordance with the present invention as shown in FIG. 1. Before applying the contact to the external interface 10, it is imperative to clean interface 10 and maintain its surface relatively free of any oxide. This is important in order to ensure good adherence of the composite contact to the silicon.

The first step in cleaning the surface of interface 10 is to degrease the pellet 30 in suitable solvents, such as in solutions of trichloroethylene and methanol. This is followed by a deionized water rinse and drying step in a nitrogen atmosphere. The unwanted silicon oxide on interface 10 is removed, for example by a suitable hydrofluoric acid etching. Next, the various laminated layers of the composite contact are deposited on the clean interface 10. Any suitable method of application can be used. For example, FIG. 2 shows such an arrangement.

The pellet 30 is placed on the substrate holder 44 with interface 10 facing the top of the vapor plator 40. A 2-inch long charge of 0.040 inch diameter gold-antimony wire is placed in the tungsten filament 41. A ⅞-inch long charge of 0.100 inch diameter gold-phosphorus wire is placed in the tungsten filament 42. Finally, a 15-inch long charge of 0.040 inch diameter gold wire is placed in the tungsten filament 43. All three filaments are spaced seven inches above the substrate holder 44. After a vacuum of about $1 \times 10^{-7}$mm of mercury is obtained using the vacuum pump 50, current is applied to each of the filaments in the following order, 41, 42 and 43, until all three charges are deposited.

As current is applied to filament 41 the gold-antimony charge begins to vaporize and the antimony atoms are the first atoms to settle on the surface of interface 10 forming layer 7A. This is due to the fact that antimony has a higher vapor pressure and lower boiling point than gold. It is believed that these antimony atoms are then oxidized by the residual oxygen present in both the vacuum atmosphere and on the surface of interface 10. It is further thought that the antimony oxide molecules thus formed then act as a "glue" and anchor the gold atoms which are subsequently deposited onto the silicon surface to form layer 7B. The combined thickness of layers 7A and 7B is approximately 1,000 A.

The antimony layer promotes good adherence of gold to silicon and also contributes to the desired $N^+$ doping level of the composite contact. When a gold-antimony alloy is used, it should contain about 0.6 percent antimony by weight. The concentration of antimony in the composite contact must be kept as low as possible (i.e. sufficient to promote good bonding and wetting) because antimony tends: to reduce the solubility of silicon in gold; to segregate into pockets within the film; and to form a hard, brittle gold-antimony intermetallic compound.

After the gold-antimony charge is completely deposited, the gold-phosphorus charge in filament 42 is fired off. Since phosphorus has a higher vapor pressure and lower boiling point than gold, the phosphorus atoms will be the first to deposit on layer 7B, forming the third layer 8A. Subsequently, the fourth layer of gold 8B is also deposited and covers layer 8A. The combined thickness of layers 8A and 8B is approximately 2,600 A. When a gold-phosphorus alloy is used, it should contain about 0.2% phosphorus by weight. The gold-phoshporus alloy cannot be used as a single layer contact because it has poor wetting properties with silicon. The phosphorus provides a uniform $N^+$ dopant distribution throughout the contact and reduces any segregation effects caused by antimony. This is important because if the N-type dopant impurities segregate within the composite contact, the power stability of the device is reduced.

If an additional gold layer 9 is needed to meet the thickness requirements for bonding or soldering pellet 30 to a support member of electrode lead, the necessary charge size is placed in filament 43 and fired off. For this example the thickness of layer 9 is approximately 8,000 A. For signal type semiconductor devices, layer 9 is usually in the range between 5,000 and 50,000 A. While gold is used in the preferred example in FIG. 1, any of the noble metals, silver, platinum, gold or alloys thereof, may be used for layers 7B, 8B and 9.

After the multiple laminated layers of the composite contact have been deposited as shown in FIG. 1, the pellet is subjected to a two-step heating cycle. The first step is a preheat at a temperature in the range of 250°–350°C for five minutes in a nitrogen atmosphere before proceeding to the second step to ensure that a uniform heat distribution exists throughout the pellet. This is immediately followed by the second step where the pellet is heated in a nitrogen atmosphere to a temperature in the range of 300°–650°C for from 5 to 30 minutes, depending on device requirements. The temperatures and times chosen are used to control the amount of free gold (i.e. the gold that has not entered into the formation of a gold-silicon eutectic) that remains on the surface of the composite contact after the heating cycle is completed. Generally, the higher the temperature or the longer the time, the less the amount of free gold remaining. It is believed that the amount of free gold present determines how well the pellet will bond or solder to a suitable support member or electrode lead. Once the heating cycle has been completed, the composite contact 20 takes on a hatched structure with lines at 30°, 60° and 90° to each other. It is believed that at this point the composite contact is no longer a series of multiple laminated layers but instead an interdiffused mixture of at least three metallic elements.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What I claim as new and desire to secure by Letters Patent of the United States is:

1. The method of making an improved non-rectifying, metallic contact to a surface of a body of semiconductor material comprising the steps of a. depositing by condensation on said surface, the evaporation products of an evaporable charge of gold-antimony, to form a first layer of antimony and a second layer of gold covering said first layer;

b. depositing by condensation on said second layer, the evaporation products of an evaporable charge of gold-phosphorus, to form a third layer of phosphorus and a fourth layer of gold covering said third layer;

c. heating said deposited layers to a temperature in the range of 300° to 350°C for a sufficient time to achieve a uniform temperature throughout said body and said contact; and d. heating said body and contact to a temperature in the range of 360°–570°C for a time sufficient to form an interdiffused composite contact.

2. The method of making an improved non-rectifying, metallic contact to a surface of a body of semiconductor material comprising the steps of a. depositing on said surface a first layer of antimony;

b. depositing a second layer of gold covering said first layer;

c. depositing a third layer of phosphorus covering said second layer;

d. depositing a fourth layer of gold covering said third layer;

e. heating said deposited layers to a temperature in the range of 300° to 350°C for a sufficient time to achieve a uniform temperature throughout said body and said contact; and f. heating said body and contact to a temperature in the range of 360°–570°C for a time sufficient to form an interdiffused composite contact.

* * * * *